(12) United States Patent
Baer et al.

(10) Patent No.: US 8,771,779 B2
(45) Date of Patent: *Jul. 8, 2014

(54) METHOD FOR REVERSING AN OXIDIZED OFF-FLAVOR FROM MILK

(75) Inventors: Robert J. Baer, Brookings, SD (US);
Howard H. Bonnemann, Brookings, SD (US)

(73) Assignee: South Dakota State University, Brookings, SD (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/855,642

(22) Filed: Aug. 12, 2010

(65) Prior Publication Data

US 2010/0323076 A1 Dec. 23, 2010

Related U.S. Application Data

(63) Continuation-in-part of application No. 11/014,330, filed on Dec. 16, 2004, now Pat. No. 8,475,864.

(51) Int. Cl.
*A23C 9/00* (2006.01)

(52) U.S. Cl.
USPC .......................... 426/580; 426/491; 426/520

(58) Field of Classification Search
USPC ......... 426/478, 490, 491, 492, 520, 521, 522, 426/580, 583
See application file for complete search history.

(56) References Cited

U.S. PATENT DOCUMENTS

| | | | |
|---|---|---|---|
| 3,329,505 | A | 7/1967 | Rausing |
| 3,949,099 | A | 4/1976 | Kaufman |
| 4,053,644 | A | 10/1977 | Swaisgood |
| 4,996,069 | A | 2/1991 | de Hey et al. |
| 5,139,803 | A | 8/1992 | Haynes et al. |
| 5,178,892 | A | 1/1993 | Simmons et al. |
| 2,709,137 | A | 5/1995 | Freund et al. |
| 5,427,806 | A | 6/1995 | Ekanayake et al. |
| 6,153,240 | A | 11/2000 | Tottenham et al. |
| 2001/0026825 | A1 | 10/2001 | Reaves et al. |
| 2003/0054079 | A1 | 3/2003 | Reaves et al. |

OTHER PUBLICATIONS

F.W. Bodyfelt, M.S. et al., "The Sensory Evaluation of Dairy Products", 1988, pp. 67-76, Van Nostrand Reinhold.
John M. DeMan, "Principals of Food Chemistry", 1980, pp. 58-67, Avi Publishing Company.
James Lloyd Henderson, M.S., Ph.D., "The Fluid-milk Industry", 1971, p. 219 Avi Publishing Company.
Dr. Charles White, "Protecting Milk from Light", Apr. 1984, Dairy Record.
Arthur Hansen, "Making Milk Taste Better", Feb. 25, 1998, vol. 143, No. 4, Hoard's Dairymen.
Kitty Broihier, R.D., "Milking It", Mar. 1998, vol. 60, No. 3, Food Processing.
I.A. Gould, Jr. et al., "Effect of Heat on Milk With Especial Reference to the Cooked Flavor", May 1939, Mechanical Bulletin 164, Michigan State College.
Vladimir N. Krukovsky, et al., "The Influence of Tocopherols and Cod Liver Oil on the Stability of Milk", 1949, vol. 32, Journal of Dairy Science.
Stuart Patton, "The Mechanism of Sunlight Flavor Formation in Milk With Special Reference to Methionine and Riboflavin", 1954, vol. 37, Journal of Dairy Science.
Dairy Science and Technology, "www.foodsci.uoguelph.ca/dairyedu/fluid.html", Dairy Products: Overview and Fluid Milk Products.
Dairy Science and Technology, "www.foodsci.uoguelph.ca/dairyedu/fluid.html", Pastuerization.
Dairy Science and Technology, "www.foodsci.uoguelph.ca/dairyedu/fluid.html", UHT Processing.
MSN Encarta—Print Preview—Milk, "encarta.msn.com/text_761562453_2/milk.html", Milk.
HowStuffWorks, "www.science.howstuffworks.com/question147.html", What are homogenization and pasteurization.
Energy Technologies, "tristate.apogee.net/et/exifi.asp", Milk Processing Industry.
SSP PVT Limited, "www.sspinda.com/dairy-industry", Liquid Milk Processing Plant.
Basic Flow—HIST Pasteurization, "www.foodsci.uoguelph.ca/deicon/basic.html", HIST milk pasteurization equipment and the flow of milk through it.

*Primary Examiner* — Leslie Wong
(74) *Attorney, Agent, or Firm* — Morriss O'Bryant Compagni

(57) ABSTRACT

A method of reversing the formation of an oxidized off-flavor in milk that includes providing milk, and heating the milk to a temperature between approximately 70° C. and approximately 90° C. for a period of between approximately 25 seconds and approximately 60 seconds.

14 Claims, 2 Drawing Sheets

METHOD FOR REVERSING AN OXIDIZED OFF-FLAVOR FROM MILK

CROSS REFERENCE TO RELATED APPLICATION

This application is a continuation-in-part of non-provisional U.S. Ser. No. 11/014,330, filed Dec. 16, 2004, now U.S. Pat. No. 8,475,864, the entire contents of which are incorporated herein by reference.

BACKGROUND OF THE INVENTION

1. Field of the Invention

The present invention relates to methods for processing milk, and more particularly pertains to a new process for removing or reversing an oxidized off-flavor from milk.

2. Description of the Prior Art

Milk may acquire an off-taste in a number of ways. For example, under proper conditions, unsaturated fatty acids that are present in milk fat can react with oxygen to form oxidation products, and the presence of these oxidation products in the milk can give an "oxidized off-flavor" to the milk. More specifically, milk that has an oxidized off-flavor will exhibit a cardboard-like, metallic or tallowy taste and smell (Bodyfelt, F. W., J. Tobias, and G. M. Trout, 1988, The Sensory Evaluation of Dairy Products, Van Nostrand Reinhold, New York, N.Y.).

The rate of oxidation of these unsaturated fatty acids can be affected by many factors, including the amount of oxygen present in the environment, the degree of unsaturation of the lipid in the milk, the presence of antioxidants or pro-oxidants in the milk, the nature of the packaging material for the milk, the temperature of the storage of the milk, and the degree of light exposure to the milk (deMan, J. M., 1980, Principles of Food Chemistry, The AVI Publ. Co., Inc., Westport, Conn.). "Metal induced" oxidized off-flavor in milk was once a common problem caused by metal contamination of the milk, which resulted from exposure to dairy equipment that contained copper. Today most dairy equipment is manufactured from stainless steel, which does not cause metal contamination of milk and, thus, stainless steel does not contribute to a metal-induced oxidized off-flavor in milk. (Henderson, J. L., 1971, The Fluid-Milk Industry, $3^{rd}$ ed., The AVI Publ. Co., Inc., Westport, Conn.). Despite this change in equipment, the problem of the oxidized off-flavor in milk has not disappeared.

In 1962, only about 3% of the fluid milk produced in the U.S. was packaged in plastic containers, while today about 81% of the fluid milk is packaged in plastic containers. Plastic containers that are clear in character easily transmit ultraviolet light (e.g., light waves in the 350 to 500 nanometer range), which is damaging to milk nutrients and can cause "light-induced" oxidized off-flavor (also known as light-activated flavor) in the milk (White, C., 1984, Dairy Record 85(4):122).

Ultraviolet light is produced by fluorescent lights, which are found in most dairy display cases in supermarkets in the United States. The time of light exposure that produces light-induced oxidized off-flavor in milk is dependent upon the distance of the milk container from the fluorescent light. It is estimated that for large supermarkets, the turnover rate of milk in the display case ranges from approximately 4 hours to 8 hours and the typical range of fluorescent light intensity is between 750 and 1000 lux (White, C., 1984, Dairy Record 85(4):122). Exposure of milk to fluorescent light for extended periods of time can also cause the loss of vitamins A, B2 (riboflavin) and C from the milk (Hansen, A., 1998, Hoard's Dairymen 143(4):147).

Several approaches have been reported for attempting to prevent or inhibit the acquisition of an oxidized off-flavor by milk. The reduction in the per capita consumption of milk in the U.S. has been attributed to the increased use of plastic milk containers and increased incidence of light-induced oxidized off-flavor (Hansen, A., 1998, Hoard's Dairymen 143 (4):147). Paper milk cartons typically provide greater protection than clear glass or clear plastic from the development of light-induced oxidized off-flavor in milk. Opaque or pigment-modified containers can inhibit light-induced oxidized off-flavor. Such containers have been developed by adding light blocking agents to the resins before blow molding single-service plastic bottles (Bodyfelt, F. W., J. Tobias, and G. M. Trout, 1988, The Sensory Evaluation of Dairy Products, Van Nostrand Reinhold, New York, N.Y.). Today some dairy plants are offering milk in opaque colored bottles that protect the flavor and nutrients of the milk (Broihier, K., 1998, Food Processing 60(3):53). These containers do appear to offer better protection from light than clear plastic containers; however some light can still be transmitted through the wall of the container.

Other factors may minimize or reduce the formation of the oxidized off-flavor in milk. Homogenization of milk increases the surface area of the fat globules in the milk, and the composition and the properties of the fat globules change. The new membrane that is formed around the fat globule consists primarily of protein which protects the phospholipids in the milk fat from attack by oxygen. This mechanism can give the homogenized milk some protection against the development of a "metal-induced" oxidized off-flavor. However, the homogenized milk is more susceptible to "light-induced" oxidized off-flavor (Bodyfelt, F. W., J. Tobias, and G. M. Trout, 1988, The Sensory Evaluation of Dairy Products, Van Nostrand Reinhold, New York, N.Y.). High heat treatment of milk at 76° C. to 78° C. provides some protection against the development of an oxidized off-flavor. Sulfide and sulfhydryl groups from whey proteins are liberated or activated, which can act as antioxidants (Gould, I. A. and H. H. Sommer, 1939, Michigan Agr. Exp. Stn. Tech. Bull. 164).

Another factor which may control the formation of an oxidized off-flavor in milk is the introduction of green feed into the dairy cow rations (Bodyfelt, F. W., J. Tobias, and G. M. Trout, 1988, The Sensory Evaluation of Dairy Products, Van Nostrand Reinhold, New York, N.Y.). Also, increasing the tocopherol (vitamin E) content in the milk can inhibit the formation of an oxidized off-flavor in the milk (Krukovsky, 1949, J. Dairy Sci. 32:196).

The oxidative reaction, once started however, is a chain reaction. New free radicals are produced that continue the reaction, and oxidized off-flavor becomes stronger with time. Aldehydes, ketones and methional are compounds that typically cause oxidized off-flavors. "Metal-induced" oxidized off-flavor has been described as a cardboard-like or tallowy taste, and "light-induced" oxidized off-flavor has been described as a cabbage-like, chemical-like, burnt protein, burnt feathers, burnt plastic or mushroom-like taste (Bodyfelt, F. W., J. Tobias, and G. M. Trout, 1988, The Sensory Evaluation of Dairy Products, Van Nostrand Reinhold, New York, N.Y.). It has been postulated that when the amino acid methionine is exposed to light in the presence of riboflavin (vitamin B2), which is also present in milk, a degradation occurs which leads to the formation of methional. Methional is an important compound that contributes to "light-induced" oxidized off-flavor (Patton, S., 1954, J. Dairy Sci. 37:446).

While a number of studies have reported the inhibition or partial inhibition of the formation of a "light-induced" oxidized off-flavor in milk, none of the known studies have reported the reversal of a light-induced oxidized off-flavor in milk once the off-flavor has been formed in the milk.

Thus, while the known literature has dealt to some extent with attempts to prevent or mitigate the formation of an oxidized off-flavor in milk, the techniques described in the literature fail to address the reduction or elimination of the oxidized off-flavor in milk once it has occurred. Therefore, there is a need for a method for removing or reversing the oxidized off-flavor in the milk once it has occurred.

SUMMARY OF THE INVENTION

In view of the foregoing failure of the prior art to provide a means for removing or reversing an oxidized off-flavor in milk, the present invention is believed to fulfill a significant need in the milk processing industry for solving the vexing problem presented by the acquired oxidized off-flavor.

The present inventors have discovered a method to reverse light-induced oxidized off-flavor in milk which, after lapsed storage time, results in the milk developing the taste of, or comparable to, normal milk. The invention may, in one embodiment, be integrated into conventional milk processing procedures that are typically used in a milk processing plant to process raw milk for retail sale.

To attain this, the present invention generally contemplates a method of treating milk that effects a reversal of the formation of an oxidized off-flavor in milk. The method comprises providing milk and heating the milk to a temperature between approximately 70° C. and approximately 90° C. for a period of between approximately 25 seconds and approximately 60 seconds. In one embodiment of the invention, the process may consist of, or essentially consist of, these elements. In other embodiments of the invention, the process may comprise additional elements.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before describing the various embodiments of the invention in detail, it is to be understood that the invention is not limited in its application to the details of construction, nor to the arrangements of the components set forth in the following description or illustrated drawings. The invention is capable of other embodiments and of being practiced and carried out in various ways. Also, it is to be understood that the phraseology and terminology employed herein is for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the capability to remove or reverse an oxidized off-flavor from milk as a part of milk processing in a milk processing plant.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
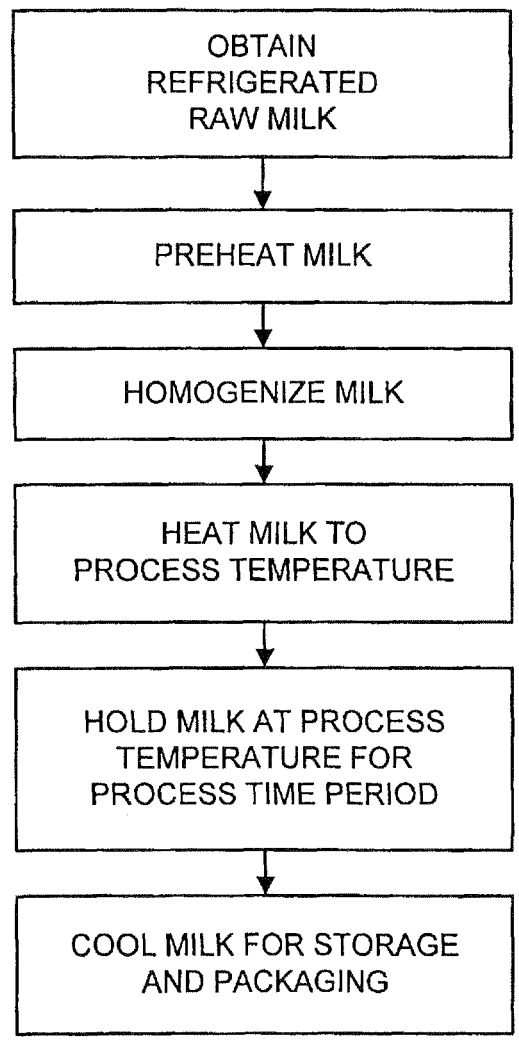
FIG. 1 is a schematic flow diagram of a new process for reversing or removing an oxidized off-flavor from milk according to the present invention.
Figure 2:
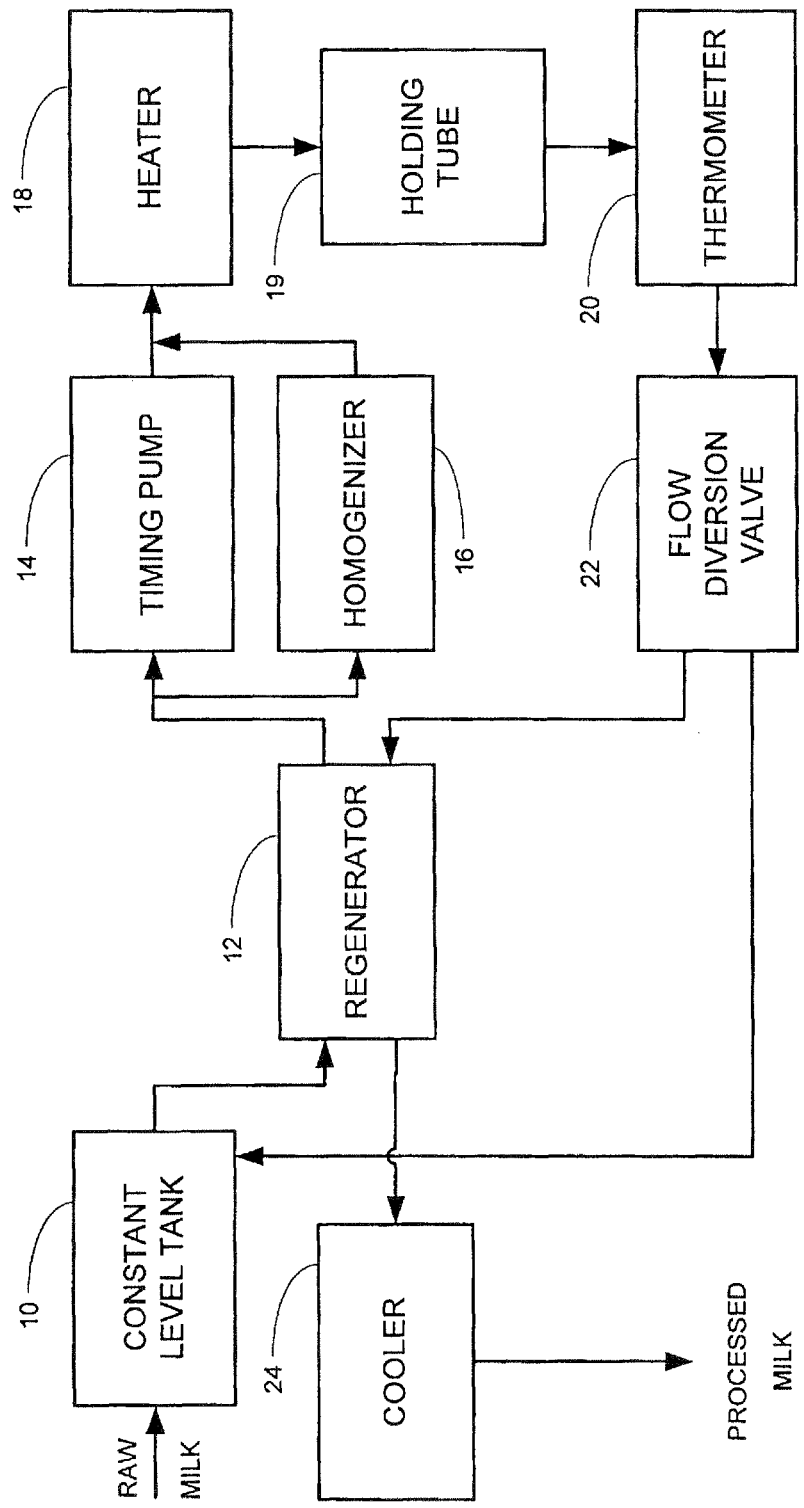
FIG. 2 is a schematic and highly simplified diagram of an apparatus suitable for practicing the process of the present invention.

With reference to FIGS. 1 and 2, a new method for removing an oxidized off-flavor in milk embodying the principles and concepts of the present invention will be described. To facilitate the description of the invention, and provide a common understanding of the terms used in describing the invention, a number of definitions will be set forth before the invention is described in detail.

For the purpose of this description, "milk" refers to the lacteal secretion produced by a ruminant animal, such as a dairy cow. The milk may contain various fat concentrations, and thus includes, but is not limited to, skim or nonfat milk, 1% (low) fat milk, 2% (reduced) fat milk, or whole milk, as well as flavored milks of these various fat concentrations. The milk may be homogenized or not homogenized.

The term "raw milk" as used herein refers to milk extracted from an animal, and which has not been pasteurized or homogenized.

The term "normal milk" as used herein refers to milk that has the characteristics of taste and smell that are typical of milk that is freshly processed for retail sale.

The term "oxidized off-flavor" has the usual meaning in the art and refers to a taste exhibited by milk having milk fat which has at least begun to oxidize.

The term "metal-induced" oxidized off-flavor refers to an oxidized off-flavor in milk that has resulted from exposure to a metal, such as, for example, copper or iron that initiates the oxidation of milk fat. Milk that has a metal-induced oxidized off-flavor typically has a cardboard-like taste or tallowy taste and a smell that is undesirable.

The term "light-induced" oxidized off-flavor refers to an oxidized off-flavor in milk that has resulted from exposure to light that includes ultraviolet wavelengths in the 350 to 500 nanometer range, such as, for example, fluorescent light or sunlight. Milk that has a light-induced oxidized off-flavor has a typical burnt feather, burnt protein, or burnt plastic taste and a smell that is undesirable. Light-induced oxidized milk is also known as light-activated flavor in milk.

The term "clear plastic container" has the usual meaning in the art and refers to clear plastic containers that comprise, for example, high-density polyethylene or polyethylene terephthalate which is typically used to manufacture plastic milk containers. Ultraviolet light from fluorescent light or sunlight is easily transmitted through plastic containers formed of such material.

The term "opaque plastic container" or "white plastic containers" has the usual meaning in the art and refers to opaque plastic containers (typically white, yellow, or cream in color) that are composed of high-density polyethylene or polyethylene terephthalate which is typically used to manufacture clear plastic containers. Opaque plastic contains added light-blocking resins. Ultraviolet light from fluorescent light or sunlight can be transmitted through these opaque plastic containers, but to a much lesser extent than clear plastic containers.

The term "unsaturated fatty acid" has the usual meaning in the art and refers to a fatty acid containing one or more double-bonds in the hydrocarbon chain of the molecule.

The term "antioxidant" has the usual meaning in the art and refers to substances that inhibit or stop oxidation.

The term "pro-oxidant" has the usual meaning in the art and refers to substances that promote or initiate oxidation.

The present invention provides a new method that is useful in the production and marketing of excellent tasting milk for consumers. The method reverses the formation of a light-induced oxidized off-flavor that has occurred in milk, and is highly suitable for application to milk that is packaged for the retail market in clear plastic containers or opaque plastic containers.

The practice of the invention may typically be carried out in a milk processing plant, although application of the process to milk that has acquired an off-flavor may be employed in other situations or with other suitable devices. Milk for processing may be that which is collected from a ruminant animal, such as a dairy cow, prior to carrying out the process of the invention, and may be part of the conventional processing of raw milk. Alternatively, the milk for processing in accordance with the invention may be milk that was previously subjected to a conventional processing procedure to ready the milk for retail sale, and which may have developed an off-flavor.

Significantly, the process of the invention is highly effective for reversing an existing oxidized off-flavor characteristic of milk. Perhaps more significantly, the process of the invention is also highly effective for "pre-treating" milk so that if milk that has been processed according to the invention does subsequently acquire an oxidized off-flavor (by, for example, exposure to light), the oxidized off-flavor characteristic will tend to be reversed or mitigated or removed as time passes, and as the milk has been removed from exposure to the oxidizing element. Thus, the milk may be tested (such as by tasting) to determine if a light-induced oxidized off-flavor is present in the milk.

In other embodiments of the invention, the process may be carried out on raw milk without making a determination as to whether there is a light-induced oxidized off-flavor present in the milk, and may be performed regardless of whether an oxidized off-flavor has been detected in the milk. The process of the invention may thus be implemented as a normal part of the processing regimen of the milk at a milk processing plant.

The milk may become "refreshed" as a result of carrying out the process of the invention, which may be performed during the conventional processing of the milk. Illustratively, and as generally depicted in FIG. 2, raw milk is collected in a tank 10 prior to processing. The tank is typically a constant level tank in which the level of the milk is continuously maintained. The milk flows out of the tank 10 to a regenerator 12 that preliminarily heats the milk flow using heat recaptured or transferred from milk that has previously passed through a heating apparatus. The milk flow is then directed to a timing pump 14 which controls the time spent by the milk in the various stages of the system by controlling the speed of the milk flow through the stages. The milk may optionally be passed through a homogenizer 16 at this stage as an alternative to flowing the milk through the timing pump 14.

The milk flow then moves through a heater 18 that heats the milk to the selected process temperature of the invention. The milk flow then moves into a holding tube 19 that operates to hold the milk at the selected process temperature for the selected process time period of the invention. The temperature of the milk at the end of the holding tube 19 is measured by a thermometer 20, and the milk passes through a flow diversion valve 22 that diverts the milk flow back to the tank 10 if the desired process temperature is not present at the end of the holding tube 19. The milk flow that has reached the desired process temperature is not diverted back to the tank 10, but is passed through the regenerator 12. The milk flow exiting the regenerator 12 then enters a cooler 24 that cools the processed milk for storage and packaging.

It should be recognized that although, in one embodiment of the invention, the process may be practiced as a process step of an otherwise conventional raw milk processing system, that portion of the milk processing system which implements the invention is distinguishable from the conventional milk processing system. More particularly, the inventive process is distinguishable from conventional processing stages, such as pasteurization, the process of which involves heating the milk for a significantly shorter period of time. Typical holding times for heated milk in commercial milk processing are between about 15 seconds and 19 seconds, and typically these times are reduced significantly if the pasteurization temperature of the process is increased over more conventional pasteurization temperatures.

It is informative to an understanding of the present invention to note that milk contains serum (whey) proteins that comprise about 20% of the total protein found in milk. Beta-lactoglobulin is one of the serum (whey) proteins found in milk, and it comprises about 10% of the total protein found in milk. Beta-lactoglobulin is a globular or spherical-shaped protein. If beta-lactoglobulin is subjected to certain conditions, including elevated temperatures for certain lengths of time, it can be partially denatured or almost complete denatured. Denaturation of the serum proteins involves an unfolding, or opening up, of the protein chains. Consequently, when a globular protein, such as beta-lactoglobulin is subjected to certain conditions, it will partially or totally denature, depending on the severity of the conditions (i.e., temperature and time).

Under the processing conditions disclosed with respect to the embodiments of the present invention, beta-lactoglobulin protein in milk is heated only enough to effect a partial denaturation of the proteins, resulting in a slight, but not full, unfolding of the globular structure. This partial modification of the protein structure permits the protein to trap or secure off-flavors in the milk, such as oxidized off-flavor. Conversely, if milk is processed at higher temperatures (e.g., at 144° F. or greater) for longer periods of time (e.g., exceeding a minute and up to several minutes), the beta-lactoglobulin protein is subject to denaturation to a significantly greater degree and as a result, the beta-lactoglobulin protein will be rendered unable to trap off-flavors or effectively reverse the oxidized off-flavor that has been acquired by the milk.

The present invention involves the heating and holding of the milk for periods of time that are distinct from those typically practiced in the conventional processing of raw milk, including pasteurization processes. Specifically, the methods of the present invention involve the heating and holding of the milk for a selected period of time, and at selected temperatures, sufficient to promote an amount of protein modification that will enable the removal of off-flavor from the milk.

Consequently, it is contemplated that the processes of the present invention will be carried out on milk, such as raw milk, that has not been previously processed in a manner that would have resulted in the substantial or complete denaturation of the proteins in the milk.

In accordance with the invention, the milk is processed for periods longer than approximately 25 seconds, and up to approximately 60 seconds. More preferably, the desired process time may range between approximately 30 seconds and approximately 50 seconds for holding the heated milk. In one particularly preferred embodiment of the invention, the desired process time ranges between approximately 30 seconds and approximately 40 seconds for holding the heated milk.

With respect to the desired process temperature, a particularly preferred range of temperatures for carrying out the process is between approximately 75° C. (167° F.) and approximately 85° C. (185° F.), and may more preferably range between approximately 75.5° C. (167.9° F.) and approximately 83.5° C. (182.3° F.).

The milk may be heated to a process temperature of between approximately 75.56° C. and approximately 83.50° C. (approximately 168° F. to approximately 178° F.) for a process time period of approximately 30 to approximately 40 seconds. In a preferred embodiment of the invention, the milk is heated to a process temperature of approximately 78.89° C. (approximately 174° F.) for a process time of approximately 37 seconds.

The heating of the milk to the selected temperature for the selected time, in accordance with the invention, is preferably accomplished by selectively adjusting the temperature to which the milk is heated by the heater 18, and by extending the length of the holding tube 19 to accomplish the holding of the heated milk flow at the selected process temperature for the selected process time. The length of the holding tube 19 would thus be significantly longer than a length of a holding tube designed for conventional raw milk processing. It will be recognized that the process time may be achieved by adjusting factors other than the length of the holding tube 19, including, for example, adjusting the flow rate of the milk through the holding tube 19.

Milk that has been treated by the process of the invention to enable the milk to be "refreshed" is then packaged for the retail market, and may be packaged in clear plastic containers or opaque plastic containers that contain light-blocking agents added to the high-density polyethylene or polyethylene terephthalate resin.

As an illustration of the comparative results of applying the inventive process to milk, Table 1, below, shows flavor scores of milk that has been exposed to fluorescent light in clear plastic containers over the various periods of time set forth in the table. In one case, the milk is 2% reduced fat milk that was "refreshed" according to the present invention, and in another case, the milk is 2% reduced fat milk that was not subjected to the process according to the present invention (i.e., "not refreshed"). For the purposes of the example, a flavor score of 1 indicates no light-induced oxidized off-flavor (excellent or best flavor), 5 indicates definite light-induced oxidized off-flavor, and 9 indicates a pronounced light-induced oxidized off-flavor (poorest flavor).

The flavor scores for "refreshed" 2% reduced fat milk, as shown in Table 1, are based upon milk that was processed in accordance with the invention at a temperature of approximately 78.89° C. (174° F.) for approximately 37 seconds. The flavor scores for "not refreshed" 2% reduced fat milk are based upon milk that was processed at a temperature of approximately 80.00° C. (176° F.) for approximately 18 seconds. Both the "refreshed" and "not refreshed" milk were placed in clear plastic containers and were then exposed to fluorescent light (1000 lux) over time (0 to 24 hours) and held at 4° C. In large supermarkets, a milk sales turnover rate ranges between 4 hours and 8 hours, and typical fluorescent light intensity ranges from 750 lux to 1000 lux (White, C., 1984, *Dairy Record* 85(4):122). Therefore, fluorescent light exposure (1000 lux) was selected to simulate typical commercial conditions under which the majority of fluid milk is held for sale in the United States.

TABLE 1

| Fluorescent light | Storage time (hours) | | | |
|---|---|---|---|---|
| Exposure time (hours) | 0 | 24 | 72 | 96 |
| | | Flavor scores | | |
| "Refreshed" 2% reduced fat milk | | | | |
| 0 | 1 | 1 | 1 | 1 |
| 4 | 4 | 2 | 1 | 1 |
| 4½ | 4 | 2 | 2 | 1.5 |
| 5 | 5 | 4 | 3 | 2.5 |
| 6 | 5 | 5 | 3 | 4 |
| 7 | 6 | 5.5 | 5 | 5 |
| 24 | — | 7 | 6 | 6 |
| "Not refreshed" 2% reduced fat milk | | | | |
| 0 | 1 | 1 | 1 | 1 |
| 4 | 4.5 | 5 | 3 | 5 |
| 4½ | 5 | 6 | 5.5 | 6 |
| 5 | 6 | 6.5 | 6 | 6 |
| 6 | 6 | 7 | 6 | 7 |
| 7 | 7 | 7 | 7 | 8 |
| 24 | — | 8 | 8 | 8 |

In the illustrative example, the 2% reduced fat milk that was exposed to fluorescent light for four hours was "refreshed" and the light-induced oxidized off-flavor score of the milk was improved from a score of 4 to a score of 1 (excellent or best flavor) after 72 and 96 hours, respectively, of storage (e.g., under conditions simulating conventional storage of the milk by a consumer in refrigerated conditions). The formation of the light-induced oxidized off-flavor in the milk was substantially completely reversed to the flavor of normal milk. Flavor scores of "refreshed" 2% reduced fat milk improved, changing from a score of 5 (definitely exhibiting a light-induced oxidized off-flavor) to a score of 2.5 (exhibiting only a slight light-induced oxidized off-flavor) after up to five hours of exposure to fluorescent light and following storage of the treated milk up to 96 hours. Flavor scores of the "refreshed" 2% reduced fat milk improved only slightly after exposure to fluorescent light for 6, 7 and 24 hour time periods and following storage of the treated milk for 96 hours. The "not refreshed" 2% reduced fat milk exhibited a definite light-induced oxidized off-flavor after four or more hours of exposure to fluorescent light. The "not refreshed" 2% reduced fat milk exhibited no reversal of light-induced oxidized off-flavor in any of the samples, during subsequent storage for up to 96 hours. The "refreshed" 2% reduced fat milk appeared to exhibit a definite reversal of light-induced oxidized off-flavor for milk exposed to fluorescent light for four, four and one-half, and five hours following storage of the treated milk for 24, 72 and 96 hours.

In another illustration of the effectiveness of the process of the invention, Table 2 depicts flavor scores of "refreshed" 2% reduced fat milk, that was heated to approximately 78.89° C. (approximately 174° F.) for approximately 37 seconds, and "not refreshed" 2% reduced fat milk heated to approximately 80.00° C. (approximately 176° F.) for approximately 18 seconds, which was placed in white plastic containers and exposed to fluorescent light (1000 lux) over time a period of time (0 to 24 hours) and stored at 4° C.

TABLE 2

| Fluorescent light Exposure time (hours) | Storage time (hours) | | | | |
|---|---|---|---|---|---|
| | 0 | 24 | 72 | 96 | 168 |
| | Flavor scores | | | | |
| "Refreshed" 2% reduced fat milk | | | | | |
| 0 | 1 | 1 | 1 | 1 | 1 |
| 4 | 1 | 1 | 1 | 1 | 1 |
| 6 | 2 | 1 | 1 | 1 | 1 |
| 7 | 3 | 1 | 1 | 1 | 1 |
| 9 | 3.5 | 2 | 1 | 1 | 1 |
| 11 | 5 | 3.5 | 2 | 1 | 1 |
| 24 | — | 5 | 4.5 | 4.5 | 4.5 |
| "Not refreshed" 2% reduced fat milk | | | | | |
| 0 | 1 | 1 | 1 | 1 | 1 |
| 4 | 2 | 3 | 3.5 | 4 | 3 |
| 6 | 3 | 4 | 4 | 5 | 4.5 |
| 7 | 4 | 5 | 5 | 6 | 6 |
| 9 | 5 | 5 | 6 | 6 | 7 |
| 11 | 6 | 6 | 7 | 7 | 7 |
| 24 | — | 7 | 7.5 | 8 | 8 |

Flavor scores of "refreshed" 2% reduced fat milk and not "refreshed" 2% reduced fat milk exposed to fluorescent light in white plastic containers over time are given in Table 2. In the "refreshed" 2% reduced fat milk that was exposed to fluorescent light for up to eleven hours, the taste of the milk improved to a score of one (excellent or best flavor) after 168 hours of storage (i.e., under conditions simulating conventional storage of the milk by a consumer in refrigerated conditions). In these milks, the light-induced oxidized off-flavor appeared to be completely reversed to the flavor of normal milk. The flavor scores of the "refreshed" 2% reduced fat milk showed little reversal of light-induced oxidized off-flavor after exposure to fluorescent light for 24 hours followed by storage for 168 hours. The "not refreshed" 2% reduced fat milk exhibited no reversal of light-induced oxidized off-flavor in any of the samples after fluorescent light exposure for any storage time.

The foregoing is considered as illustrative only of the principles of the invention. Further, since numerous modifications and changes may be implemented to adapt the invention, it is not desired to limit the invention to the exact implementation and operation shown and described, and accordingly, all suitable modifications and equivalents may be resorted to, falling within the scope of the invention.

We claim:

1. A method of reversing the formation of an oxidized off-flavor in milk, comprising:
   providing milk that has not been previously treated by exposure to elevated temperatures for periods of time sufficient to substantially or completely denature the proteins contained in the milk; and
   heating the milk to a temperature between approximately 70° C. and approximately 90° C. for a period of between approximately 25 seconds and approximately 60 seconds.

2. The method of claim 1 wherein the milk is heated to a temperature between approximately 75° C. and approximately 85° C.

3. The method of claim 1 wherein the milk is heated to a temperature of between approximately 75.5° C. and approximately 83.5° C.

4. The method of claim 1 wherein the period that the milk is heated is between approximately 30 seconds and approximately 50 seconds.

5. The method of claim 1 wherein the period that the milk is heated is between approximately 30 seconds and approximately 40 seconds.

6. The method of claim 1 additionally comprising the step of pasteurizing the milk prior to the step of heating the milk.

7. The method of claim 6 additionally comprising the step of homogenizing the milk prior to the step of heating the milk.

8. The method of claim 1 wherein the milk provided has an oxidized off-flavor.

9. The method of claim 1 wherein the milk provided does not have an oxidized off-flavor.

10. The method of claim 1 additionally comprising exposing the milk to a factor causing an oxidized off-flavor.

11. The method of claim 10 additionally comprising removing the milk from exposure to the factor causing an oxidized off-flavor, and storing the milk for a time period prior to consumption during which a degree of the oxidized off-flavor present in the milk decreases.

12. The method of claim 1 wherein the steps of providing milk and heating the milk is performed in a continuous manner.

13. The method of claim 1 wherein the milk provided for heating is raw milk.

14. The method of claim 1 wherein the milk product provided for heating is raw milk that has been previously pasteurized.

* * * * *